Oct. 25, 1955    R. V. VAN DE VANTER    2,721,599
METHOD OF AND APPARATUS FOR MAKING GLASS RODS
Filed Jan. 12, 1952    5 Sheets-Sheet 1

INVENTOR.
Raymond V. Van DeVanter.
BY
Harness, Dickey & Pierce
ATTORNEYS.

Oct. 25, 1955    R. V. VAN DE VANTER    2,721,599
METHOD OF AND APPARATUS FOR MAKING GLASS RODS
Filed Jan. 12, 1952    5 Sheets-Sheet 2

INVENTOR.
Raymond V. Van DeVanter.
BY
Harness, Dickey & Pierce
ATTORNEYS.

Oct. 25, 1955 R. V. VAN DE VANTER 2,721,599
METHOD OF AND APPARATUS FOR MAKING GLASS RODS
Filed Jan. 12, 1952 5 Sheets-Sheet 3

INVENTOR.
Raymond V. Van De Vanter
BY
Harness, Dickey & Pierce
ATTORNEYS.

Oct. 25, 1955 R. V. VAN DE VANTER 2,721,599
METHOD OF AND APPARATUS FOR MAKING GLASS RODS
Filed Jan. 12, 1952 5 Sheets-Sheet 5

INVENTOR.
Raymond V. Van DeVanter.
BY
Harness, Dickey & Pierce
ATTORNEYS.

United States Patent Office 2,721,599
Patented Oct. 25, 1955

2,721,599

METHOD OF AND APPARATUS FOR MAKING GLASS RODS

Raymond V. Van de Vanter, Sturgis, Mich., assignor to Orchard Industries, Inc., Detroit, Mich., a corporation of Michigan Application January 12, 1952, Serial No. 266,124

7 Claims. (Cl. 154—1.7)

The present invention relates to a novel and improved method of and apparatus for making rods by a continuous process. More particularly, the present invention relates to a method and apparatus for making rods formed of a large number of fine filaments surrounded and bonded together by a plastic material.

It is an object of the present invention to provide a new and improved method of and apparatus for making rods of the above mentioned type by a continuous process wherein a bundle of filaments coated with a hardenable plastic, is moved through and supported in a form during the hardening of the plastic and maintained out of contact with the form by a layer of material which facilitates the movement of the bundle through the form.

Another object of the present invention is to provide a new and improved method and apparatus of the above mentioned type in which the form has a slot extending longitudinally of its upper side which co-operates with the layer of material to facilitate the escape of gas during the movement of the bundle through the form.

It is also an object of the present invention to provide a new and improved method and apparatus of the above mentioned type for making rods by a continuous process wherein the bundle of fine filaments coated with a suitable plastic material, are covered by a thin layer of material having no tension component at right angles to the axis of the bundle.

A further object of the present invention is to provide a new and improved method and apparatus of the above mentioned type wherein the form in which the plastic is hardened has a longitudinally extending slot and the layer of material is adapted to permit the escape of gas from the bundle throughout the extent of said slot.

Another object of the present invention is to provide a new and improved method of and apparatus for making a rod having a central core of electrically conductive material surrounded by a material which is a nonconductor of electricity.

Other and more detailed objects of the present invention will become apparent from a consideration of the following specification, the appended claims and the accompanying drawings, wherein:

The present invention contemplates the provision of a new and improved method of making rods comprising a large number of fine filaments bonded together by and the space between which is completely filled by a plastic material.

The novel method of the present invention includes the steps of gathering a large number of fine filaments coated with a hardenable plastic material into a bundle having a cross-sectional shape similar to that of the rod to be made, moving the bundle through a form adapted to maintain the bundle in substantially the desired shape while maintaining the bundle out of contact with the form by means of a layer of material which also facilitates movement of the bundle relative to the form, and hardening the plastic during the movement of the bundle through the form.

More particularly, the novel method of the present invention includes the covering of the bundle of plastic coated filaments with a thin strip of material extending longitudinally of the bundle and having its sides folded about the bundle and its edge portions extending outwardly from the bundle at the upper side thereof, and moving the covered bundle horizontally through a form having a slot extending longitudinally thereof at its upper side receiving the edge portions of the strip extending upwardly from the bundle. By covering the bundle in this manner and hardening the plastic during the movement of the covered bundle through a form slotted at its upper side to receive the edge portions of the covering strip, air or other gas may escape from the bundle during the hardening of the plastic which takes place during the movement of the bundle through the form.

In the preferred form of the novel method of the present invention, the filaments employed are formed of glass and may be coated with a hardenable plastic in any suitable manner. This may be done, for example, by drawing the filaments of glass through a liquid bath of the plastic material. This plastic material may be any of a large number of commercially available resins and is preferably a low pressure laminating resin of the thermosetting type. The coated filaments are then gathered into a bundle having a shape similar to the shape of the rod to be made, as by drawing them through a restriction of this shape. The bundle is then covered with a strip of material adapted to maintain the bundle out of contact with the form and facilitate movement of the bundle through the form. In one form of the present invention this may be done by covering the bundle with a thin material of suitable strength and which will remain freely movable relative to the form during the hardening of the plastic. The commonly known material sold under the trade name "cellophane" has been found satisfactory for this purpose. The strip of cellophane or other suitable material is of a width substantially greater than the circumference of the bundle and in applying it to the bundle the strip is disposed to extend longitudinally of the bundle with its center portion beneath the bundle and the side portions are folded upwardly around the opposite sides of the bundle until they meet at the top of the bundle leaving the edge portions of the strip extending upwardly from the upper side of the bundle.

The strip is preferably forced into contact with substantially the entire outer surface of the bundle to eliminate any air which may be trapped between the bundle and the strip. This may be done by drawing the bundle and strip through a restriction of the desired shape and having a slot at its upper side for receiving and passing the upwardly extending edge portions of the strip.

The bundle and covering strip are then drawn through an elongated form adapted to support the bundle in substantially the desired shape and having a slot extending throughout its length at the upper side thereof for receiving the upwardly extending edge portions of the strip. The plastic is hardened during the movement of the bundle through this form. This may be done, in the case of thermosetting plastics for example, by heating the form as required to effect the hardening of the plastics.

To insure that the desired shape is completely filled out, the bundle is preferably of such size that in drawing it through the restriction, a small flange of plastic is forced upwardly between the upwardly extending edge portions of the strip. This flange of excess plastic acts in effect as a reservoir of liquid plastic which insures that the curing form will be filled until the plastic sets, and the parts are so dimensioned that a slight excess remains in the flange throughout the curing operation. Because of the horizontal position of the rod any air or gas in the bundle escapes at or accumulates in the flange. By making the preliminary restriction which initially forces the strip against the bundle of slightly smaller diameter than that of the curing form itself, friction between the strip and the curing form is reduced to a small value. The slots in both the restriction and the curing form are wider than twice the thickness of the strip, thus reducing friction at the slots and providing space between the overlapped edges of the strip to receive the flange of excess plastic.

After the bundle has been drawn through the form and the hardening been effected, the covering strip is removed and the upwardly extending flange is also removed, leaving a finished rod of the desired shape.

It should be noted that the process of the present invention differs markedly from prior processes in which the curing form comprises a circumferentially continuous wrapping of cellophane which maintains the bundle in a circular cross section by circumferential tension. The cellophane form of prior processes moves with the bundle during the cure and effectively prevents the escape of air or gas. In the present process the strip does not constitute the curing form because it is not in circumferential tension. The curing form is stationary and air or gas may escape freely during the curing operation. The strip merely functions as parting material to prevent adhesion between the form and the bundle. Since in the present process the strip is not in circumferential tension, it is possible to cure rods of noncircular cross section by suitably shaping the restriction and the curing form to the desired cross-sectional shape.

In one specific example of the novel method of the present invention a cylindrical rod is made as follows. A large number of fine filaments of glass are employed, such as may be purchased in spool form from the Owens-Corning Fiberglas Corporation at Toledo, Ohio under the designation: "Fiberglas EGG 150–1/0 8 strands, each twisted one turn per inch." The number of spools used is, of course, dependent upon the size of the rod to be made. It has been found that good rod characteristics are obtained by using 175 spools in the present continuous process when making a cylindrical rod of .360 inch in diameter. Each spool has 8 strands and each strand has about two hundred individual filaments. These filaments are coated with a hardenable plastic by drawing them through a bath of a low pressure thermosetting resin. While a wide variety of thermosetting resins may be employed, satisfactory results have been obtained with a resin comprising 50% of the polyester resin sold by American Cyanamid Company under the designation "Laminac 4116" and 50% of the polyester resin sold by the Naugatuck Chemical Division of the U. S. Rubber Company under the designation "Vibrin 108." To this resin is added a suitable catalyst such as 2% by weight of the paste type catalyst sold by the Lucidol Division of Novadel-Agene Corporation of Buffalo, New York, under the designation "Luperco ATC." The strands are then gathered into a bundle by drawing them through an opening of circular cross-section. The bundle is then covered by a thin strip of material such as that sold under the designation "Cellophane #450, plain transparent" and of a width substantially greater than the circumference of the bundle, the strip extending longitudinally of the bundle and being folded upwardly around the bundle with its edge portions extending upwardly from the upper side of the bundle in adjacent parallel relation. This cellophane has a thickness of about .0015 inch. To complete the wrapping of the strip to the above described relation to the bundle of plastic coated filaments and also to remove any air which may be trapped between the bundle and the strip, the bundle and the strip are drawn through a restriction adapted to force the strip into contact with substantially the entire surface of the bundle. This step in the present method accurately sizes the bundle and forces a small excess of plastic, above that required to completely fill out the desired shape, upwardly between the outwardly projecting edge portions of the strip to form a flange or flash. The covered bundle is then moved through an elongated curing form having a cylindrical interior adapted to slidably receive the covered bundle and having a slot extending longitudinally thereof at its upper side through which are moved the outwardly extending edge portions of said strip and said flash. In this specific illustration the hardening of the plastic is effected by heating it, as it moves through the curing form, to the temperatures and for the time required to effect satisfactory curing. The above mentioned plastic may be satisfactorily hardened by enclosing the curing form in four pairs of longitudinally arranged platens which are maintained at about the following temperatures measured at the upper surface of the platens:

| | ° F. |
|---|---|
| First pair | 160 |
| Second pair | 210 |
| Third pair | 210 |
| Fourth pair | 250 |

The movement of the bundle is through the portions of the curing form heated by the pairs of platens in the order in which they are listed above and is at a uniform speed such that the movement through the curing form requires about five minutes.

Subsequently to the movement through the curing form, the strip of cellophane is stripped from the hardened rod and the flash is cut off.

In this example of the novel method of the present invention the restriction through which the covered bundle is pulled is of slightly smaller diameter than the opening through which the strands are pulled to gather them into the bundle, and slightly smaller than the internal diameter of the curing form through which the covered bundle is moved during the hardening of the plastic. For example, a hardened rod of .360 inch in diameter has been made by the above described method using a bundle forming die having an opening of about .370 inch in diameter, a restriction die having an internal diameter of about .360 inch, and a curing form having an internal diameter of about .375 inch.

The present invention also contemplates the provision of an improved apparatus for making rods by a continuous process. In the preferred apparatus illustrated herein, a plurality of spools (not shown), each having a plurality of strands 22 of glass filaments are supported in any suitable manner on a rack indicated at 20, which may be of any suitable construction, and one example of which is illustrated and described in the copending application of Erik von Reis, Sherman E. Kreisher, Peter Quitter and Timothy S. Williamson, Serial No. 149,544, filed March 15, 1950.

Figure 2:
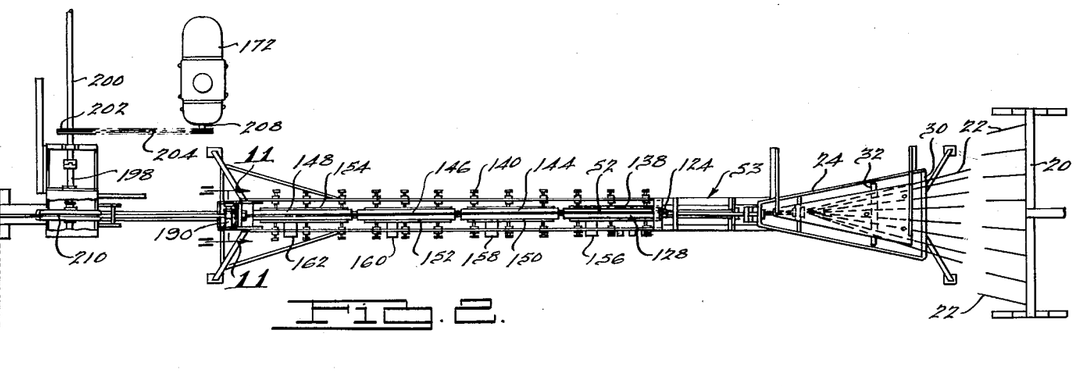
Figure 2 is a broken plan view of the apparatus illustrated in Figure 1.

The apparatus also includes a tank 24 through which the filaments of glass are moved to coat them with a suitable hardenable plastic. The tank 24 is mounted at one end of a main supporting frame formed of two parallel spaced I beams 26 which are supported on suitable legs 28. The tank 24, as viewed in Figure 2, is of generally trapezoidal shape having an end wall 29 forming the base of the trapezoid disposed at the end of the frame 26 adjacent the spool rack 20. The upper edge of this end wall is outwardly and downwardly turned as indicated at 30 to form a smooth upper surface over which the strands 22 are trained and from which they turn downwardly into the interior of the tank 24 and under a transversely extending roller 32 which is disposed below the level of the liquid hardenable plastic in the tank 24.

At its end remote from the spool rack 20 the tank 24 has an end wall 34 in which is mounted a preform die 36 having a central opening 38 through which the plastic coated glass filaments pass and the outer surface of which is threaded to facilitate the mounting of the preform die in the wall 34 by means of a nut 40 on the portion projecting inwardly of the wall 34 and a second nut 42 received on the portion projecting outwardly of the wall 34. The tank 24 also has a transversely extending wall 44 disposed parallel to the wall 34 and in spaced relation thereto, in which is mounted another preform die 46 which is similarly held in place by nuts 48 and 50. Both of the dies 36 and 46 are disposed below the level of the liquid plastic within the tank 24. In the preferred embodiment illustrated, the preform die 46 in which the filaments of glass 22 are gathered into a bundle after passing under the roller 32, is of slightly smaller internal cross-sectional area than the preform die 36 mounted in the outer wall 34 of the tank 24. For example, in making a rod of .360 inch in diameter, a die 46 having an internal diameter of .368 inch and a die 36 having an internal diameter of .372 inch have been used.

Figure 7:
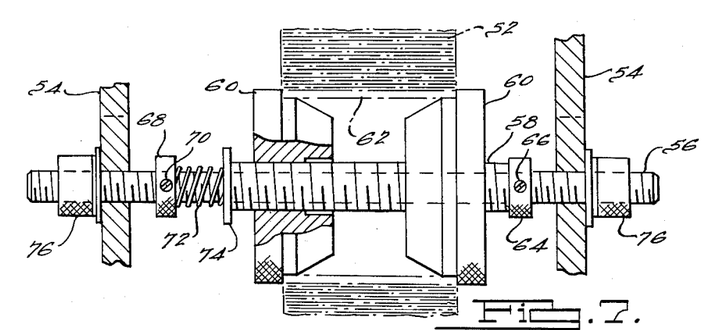
Figure 7 is an enlarged broken sectional view of the structure illustrated in Figure 1, taken along the line 7—7 thereof.

The bundle of plastic coated filaments is moved by means hereinafter described and is wrapped in a thin strip 52 of cellophane or other suitable material, by means generally indicated at 53 (see Figure 1) mounted on the I beams 26 adjacent the tank 24. A roll of the strip 52 is mounted below and supported on the I beams 26 on a pair of depending supporting bars 54 which are suitably secured to the I beams 26. In order to at all times maintain the proper disposition of the strip 52 relative to the bundle of filaments which is wrapped therein, the roll of the strip 52 is mounted for lateral adjustment on a suitable supporting means such, for example, as that illustrated in Figure 7. In the construction there illustrated a through shaft 56 is provided with externally threaded end portions and carries an externally threaded sleeve 58 freely movable relative thereto upon which are mounted a pair of hub elements 60. These fit the internal diameter of the sleeve 62 upon which the cellophane roll is carried, and are threadedly mounted on the sleeve 58. A stop collar 64 is threadedly mounted on the shaft 56 at the right-hand end of the sleeve 58 and is secured in place by a set screw 66. A second stop collar 68 is threaded on the shaft 56 in spaced relation to the opposite end of the sleeve 58 and held in place by a set screw 70. The sleeve 58 is held against the stop collar 64 by a spring 72 acting between the collar 68 and a washer 74 bearing against the lefthand end of the sleeve 58 as viewed in Figure 7. The pressure exerted by the spring 72 is only sufficient to maintain the sleeve 58 in its proper position against the stop 64 without appreciably interfering with the freedom of rotation of the sleeve 58 relative to the shaft 56. The shaft 56 may be bodily moved laterally relative to the supporting bars 54 by adjustment of a pair of knurled nuts 76 mounted on the opposite ends of the shaft 56 outwardly of the supporting bars 54. The bars 54 are provided with inclined notches 78, at the left-hand side thereof as viewed in Figure 1, which permit ready removal and assembly of the shaft 56 and elements carried thereon relative to the supporting bars 54, to facilitate replacement of the roll of the strip 52.

Figures 4, 5, 6:
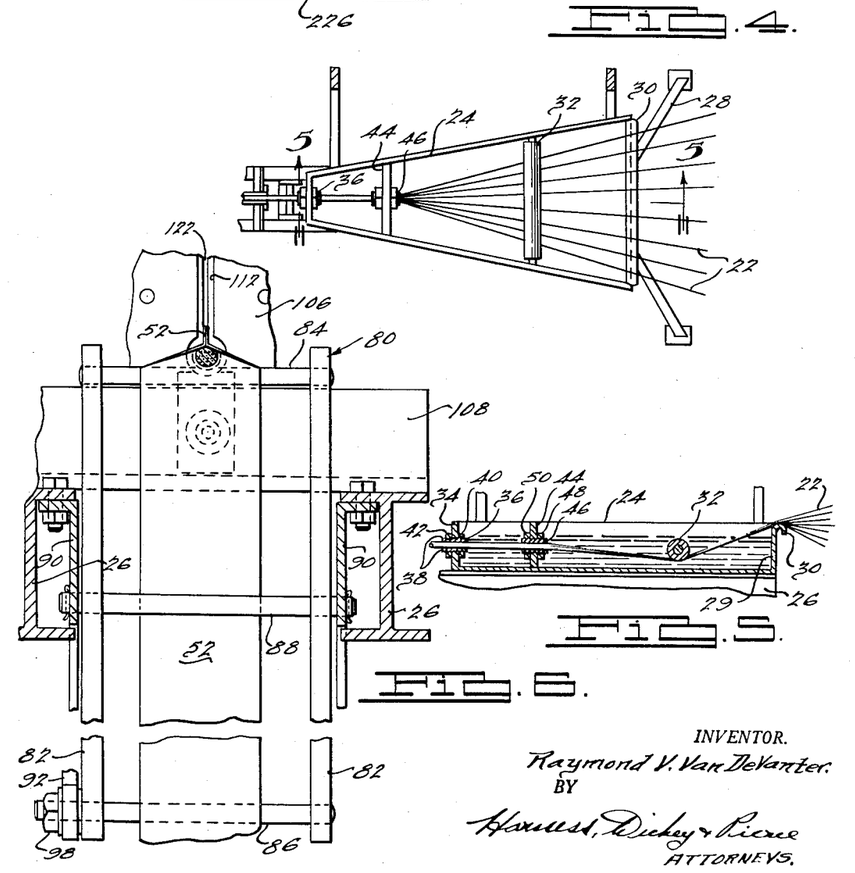
Figure 4 is an enlarged broken sectional view of the structure illustrated in Figure 1, taken substantially along the line 4—4 thereof.
Figure 5 is a broken sectional view of the structure illustrated in Figure 4, taken substantially along the line 5—5 thereof.
Figure 6 is an enlarged broken sectional view of the structure illustrated in Figure 1, taken substantially along the line 6—6 thereof.

The strip 52 is accurately positioned vertically relative to the lower side of the bundle of plastic coated filaments by means of a frame 80 which is best illustrated in Figure 6. This frame 80 comprises a pair of parallel spaced bars 82 which are vertically disposed and interconnected at their upper and lower ends by an upper rod 84 and a lower rod 86 parallel thereto. The frame 80 is supported on the I beams 26 for pivotal movement by means of a horizontally disposed pivot pin 88 mounted in depending angle brackets 90 secured to the upper and inner flanges of the I beams 26.

The frame 80 is held in a desired position of pivotal adjustment by means of a link 92 (see Figures 1 and 15), the left-hand end of which is pivotally connected to a supporting bracket 94 secured to one of the I beams 26 and the other end of which is provided with an elongated slot 96 through which one end of the lower rod 86 extends. A nut 98 is threaded on the outer end of the lower rod 86 and is effective to clamp the link 92 between the nut 98 and the adjacent bar 82 and hold the frame 80 in desired adjusted position. The strip 52 is trained around the lower rod 86, passing in front of this rod as viewed in Figure 6, thence behind the pivot rod 88 and thence about and in front of the upper rod 84 as there viewed. From the upper rod 84 the strip 52 extends to the left as viewed in Figure 9 to a wrapping form 100. This wrapping form 100 extends longitudinally of and is disposed centrally of and above the I beams 26 upon which it is supported. The form 100 has the shape of the smaller of the two segments of a sleeve or pipe defined by a plane intersecting the axis of the sleeve at one end thereof and inclined relative to the axis at a small angle. It will thus be appreciated that the form 100 has a maximum cross section at its left-hand end, as viewed in Figure 9 which, as illustrated in Figure 8, is semicircular, and has a progressively reducing cross section as the right-hand end thereof is approached.

Figure 9:
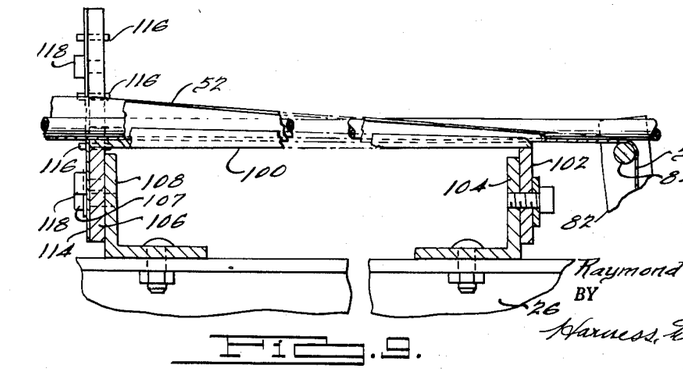
Figure 9 is a broken view of the structure illustrated in Figure 8, showing the end portions in section along the line 9—9 of Figure 8, and showing the central portion in elevation.

As best illustrated in Figure 9, the right-hand end of the form 100 is supported on a transversely extending plate 102 which is secured to the upwardly extending flange of an angle bracket 104 extending transversely of and secured to the tops of the I beams 26. At its left-hand end as viewed in Figure 9, the form 100 is supported by a transversely extending plate 106 which is secured by screws 107 to the upwardly extending flange of another transversely extending angle bracket 108 similarly secured to the I beams 26. The plate 106 is rectangular in shape and has a central opening 110 receiving the adjacent end of the form 100 and also has a vertically extending slot 112 communicating with and extending upwardly from the central opening 110 to the upper edge of the plate 106.

Figure 8:
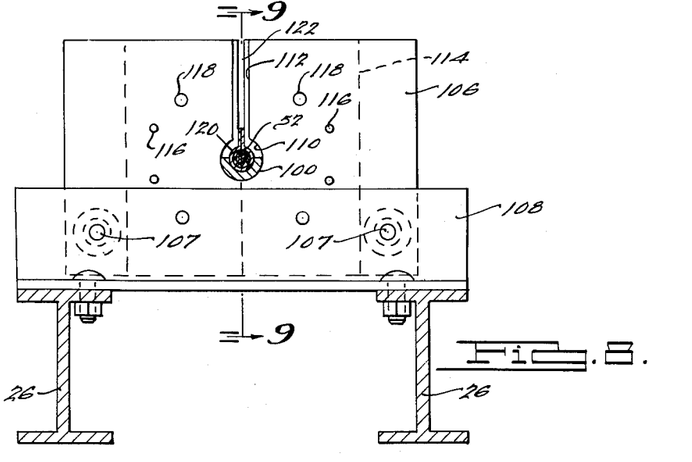
Figure 8 is an enlarged broken sectional view of the structure illustrated in Figure 1, taken along the line 8—8 thereof.

The form 100 has an upper surface disposed to fit the underside of the bundle of plastic coated filaments and initiates the wrapping of the strip 52 about the bundle of filaments and this wrapping is completed by a plate 114 which is secured to the plate 106 at the left-hand face thereof as viewed in Figure 9 or the back face thereof as viewed in Figure 8. In the preferred embodiment illustrated, the plate 114 is formed in two identical halves which are accurately located relative to the plate 106 by means of a plurality of dowel pins 116 and are secured to the plate 106 by means of the screws 118. In their assembled position the halves of the plate 114 define a central aperture 120 adapted to receive the plastic coated bundle of filaments together with the strip 52 wrapped thereabout, and also define a slot 122 communicating with and extending upwardly from the opening 120 to the upper edge of the plate 114. This slot 122 receives the upwardly extending parallel edge portions of the strip 52.

The aperture 120 in the plate 114, in the preferred embodiment of the applicant's apparatus, has a cross-sectional area slightly smaller than the cross-sectional area of the preform die 36 and serves to force the strip 52 into intimate contact with substantially the entire outer surface of the bundle of plastic coated filaments and remove all air from between the strip 52 and the bundle of filaments. It is, of course, important that all edges of the form 100 and the plate 114, with which the strip 52 comes in contact, should be rounded and smooth to prevent damage to the strip 52.

Figure 1:
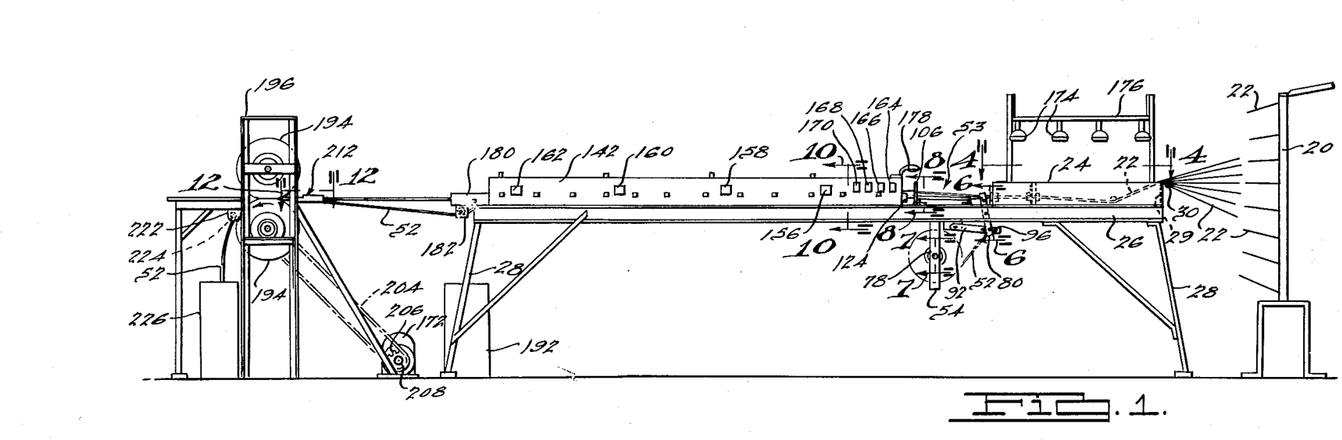
Figure 1 is a broken elevational view of an apparatus embodying the present invention.
Figure 10:
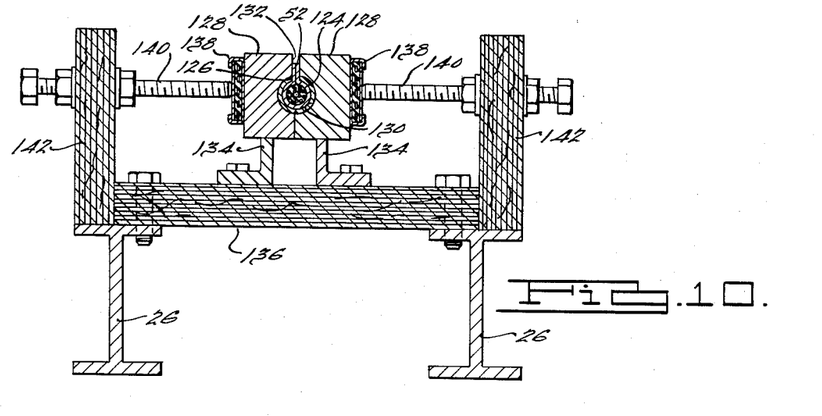
Figure 10 is an enlarged sectional view of the structure illustrated in Figure 1, taken along the line 10—10 thereof.

An elongated curing form 124, adapted to receive the bundle of plastic coated filaments wrapped with the strip 52, is mounted on the I beams 26 adjacent the strip wrapping means 53 and to the left thereof as viewed in Figure 1. The curing form 124 has a slot 126 at its upper side through which the upward extending edge portions of the strip 52 pass during movement of the wrapped bundle through the curing form 124. The curing form 124 is supported in and heated by a pair of metal platens 128, the cross-sectional shape of which is as illustrated in Figure 10 so that a pair of these platens 128 supported in the position there illustrated define a central opening 130 receiving and fitting the outer surface of the curing form 124, and an upwardly extending slot 132 communicating with and extending upwardly therefrom. These platens 128 are supported on the upwardly extending flanges of a pair of angle irons 134, the other flanges of which are secured to a horizontally disposed supporting member 136 which is in turn supported by and secured to the I beams 26. This supporting member 136 may be of any suitable material and in the preferred embodiment illustrated is formed of a relatively heavy plywood which appreciably reduces the heat loss through the supporting member 136 to the I beams 26. The platens 128 are held in proper position, and strip heating elements 138 are held against the outer vertical sides thereof by screws 140 adjustably mounted in vertically disposed side wall members 142 which in the preferred embodiment illustrated are rigidly secured to the supporting member 136 and co-operate therewith to define a channel in which are disposed the curing form 100, the platens 128, and the heater elements 138. To provide the desired variation in curing temperatures during the movement of the plastic coated filaments through the curing form 124, the platens 128 extend throughout approximately one-quarter of the entire length of the curing form 124, as is best seen in Figure 2, and the remaining portions of the curing form 124 are received in similar pairs of platens 144, 146 and 148. These pairs of platens are heated by separate pairs of strip heaters 150, 152 and 154 similar to to the strip heater 138. Thermostatic contacts 156, 158, 160 and 162 are provided on one of the side walls 142 for controlling the temperature at which the pairs of platens 128, 144, 146 and 148 are respectively maintained by the pairs of strip heaters 138, 150, 152 and 154.

Also mounted on one of the side walls 142 are four electric switches 164, 166, 168 and 170. The switch 164 controls the supply of electric power to the strip heaters 138, 150, 152 and 154, and their thermostatic controls. The switch 166 controls the supply of electric power to an electric motor 172 which is effective to move the bundle of plastic coated filaments through the rod making apparatus, as hereinafter described. The switch 168 controls a bank of heat lamps 174 which are mounted above the tank 24 on a suitable supporting frame 176 for maintaining the bath of liquid plastic in the tank 24 at a desired temperature. The fourth switch 170 controls a light 178 (see Figure 1) to facilitate the watching by an operator of the completion of the wrapping of the strip 52 about the bundle of filaments, and the entry of the wrapped bundle into the adjacent end of the curing form 124.

At the left-hand end of the curing form 124, as viewed in Figures 1 and 2, a pair of spaced plates 180 extend outwardly beyond and are suitably supported on the I beams 26. These plates 180 carry a pair of spaced depending brackets 182 which carry a transversely extending pin 184 upon which is mounted a flanged roller 186 and a pair of spacer sleeves 188 which maintain the flanged roller 186 in proper position. The strip 52 as it comes from the adjacent end of the curing form 124 is trained downwardly about the flanged roller 186 to effect removal of the strip 52 from the rods as the cured rod moves from the curing form 124.

The movement of the bundle of plastic coated filaments through the plate 114 causes a small quantity of the plastic material to flow upwardly between the edge portions of the strip 52 and during the curing in the curing form 124 the plastic is hardened to produce an upwardly extending flange or flash on the rod. This flash is removed by a cutter 190 which is mounted on one of the plates 180 and has a horizontally extending sharp edge disposed to engage the flash at its base. This flash strip may be collected in a suitable receptacle such as the drum 192 illustrated in Figure 1. A roller 193 is mounted on the plates 180 and disposed below the rod for supporting it adjacent the engagement thereof by the cutter 190 at the upper side thereof.

Figure 3:
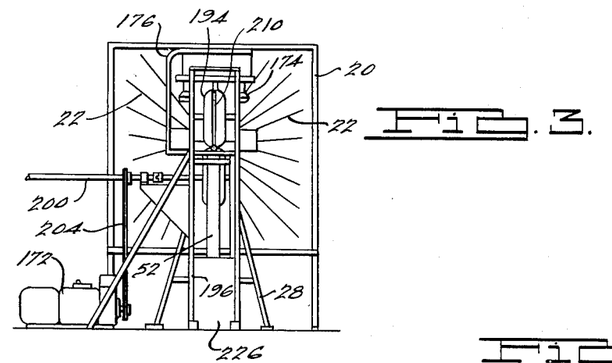
Figure 3 is an end view of the apparatus illustrated in Figure 1, taken from the left-hand end thereof.

The above described movement of the plastic coated filaments and the strip 52 and the pulling of the strip 52 over the flanged roller 186 for effecting removal of the strip 52 from the cured rod is effected by means of a pair of wheels 194 mounted on a frame 196 for rotation about parallel axes, the spacing of which is so related to the diameter of the two wheels that there is sufficient pressure between the two wheels 194 to grip the rod and the strip 52 and effect the above described movement. One of the wheels 194 is mounted on a shaft 198 suitably coupled to a shaft 200 having a sprocket wheel 202 over which is trained a chain 204 which is also trained over a sprocket 206 on the output shaft 208 of the motor 172. The wheels 194 are preferably grooved as illustrated at 210 (see Figures 2 and 3) for facilitating and maintaining proper engagement with the cured rod.

Figures 11, 12, 13, 14:
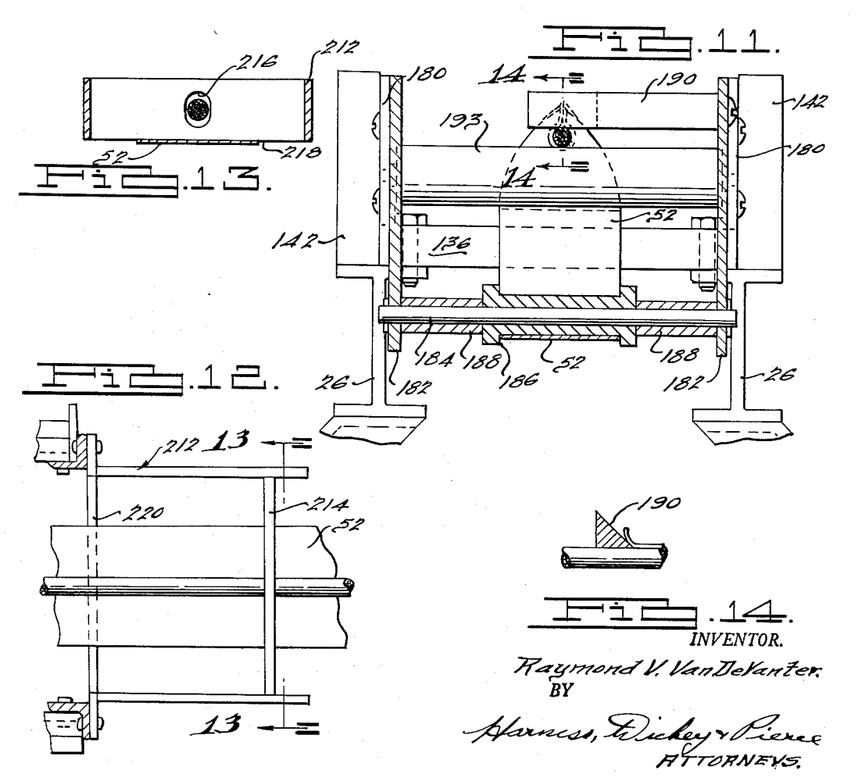
Figure 11 is an enlarged broken sectional view of the structure illustrated in Figure 2, taken along the line 11—11 thereof.
Figure 12 is an enlarged broken sectional view of the structure illustrated in Figure 1, taken along the line 12—12 thereof.
Figure 13 is a sectional view of the structure illustrated in Figure 12, taken along the line 13—13 thereof.
Figure 14 is a broken longitudinal sectional view of the structure illustrated in Figure 11, taken along the line 14—14 thereof.

To maintain the proper disposition of the strip 52, the frame 196 upon which the wheels 194 are mounted, carries a laterally extending frame 212 (see Figures 12 and 13), which includes an outer transversely extending member 214 having an enlarged opening 216 adapted to freely pass the cured rod and which has a lower edge 218 below which the strip 52 is trained. The frame 212 also has a second transversely extending member 220 disposed adjacent the point of contact of the two wheels 194 and over which the strip 52 is trained. This frame 212 insures that the strip 52 passes between the wheels 194 properly disposed at the underside of the cured rod. At the opposite or left-hand side of the frame 196 from the frame 212, a pair of depending brackets 222 support a roller 224 under which the strip 52 is trained to insure separation thereof from the finished rod and direct the used strip 52 downwardly into a suitable receptacle such as the drum 226.

The speed at which the motor 172 drives the wheels 194 must be correlated with the length of the curing form 124 to provide the curing time required. With a curing form about 8 feet long it has been found that the bundle may be moved at a rate of about 19 inches per minute.

It will now be appreciated that the above described method and apparatus permits the escape of either air which may have become entrained in the bundle or of any other gas, at any point throughout the curing of the plastic, simply by the gas passing upwardly between the adjacent edge portions of the strip 52.

Figure 15:
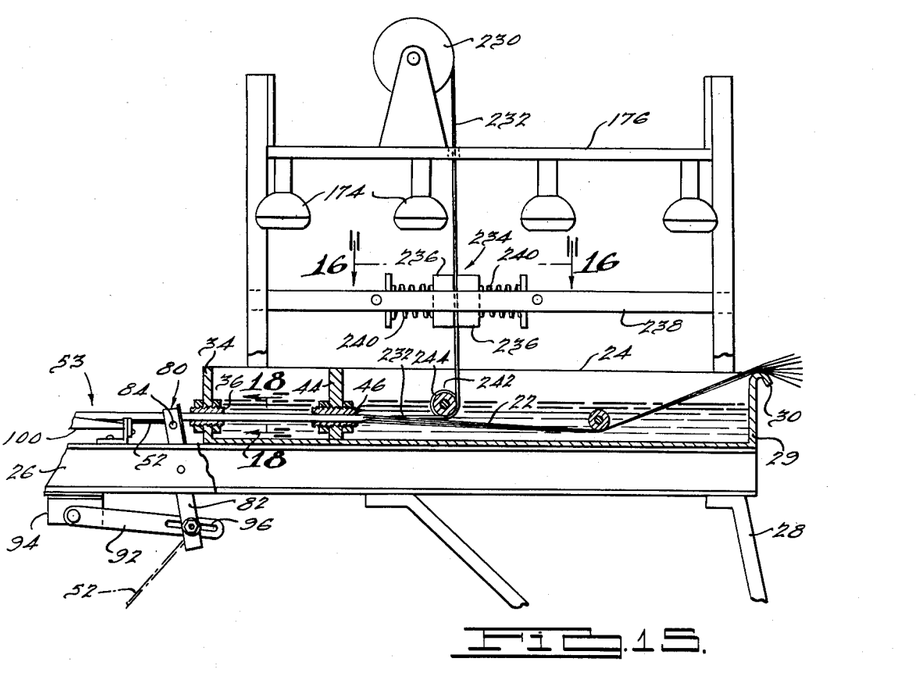
Figure 15 is a broken elevational view, having parts shown in section, showing a modification of the present invention.
Figure 16:
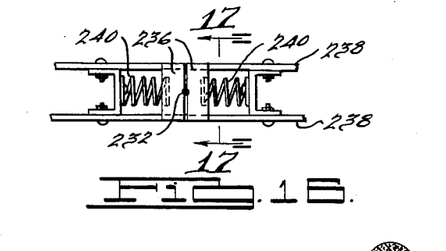
Figure 16 is a broken sectional view of the structure illustrated in Figure 15, taken along the line 16—16 thereof.
Figure 17:
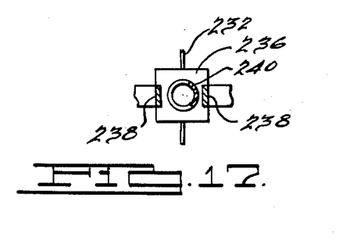
Figure 17 is a broken sectional view of the structure illustrated in Figure 16, taken along the line 17—17 thereof.
Figure 18:
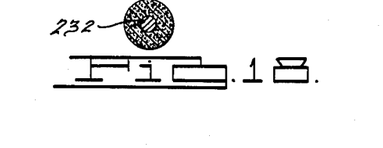
Figure 18 is a transverse sectional view taken along the line 18—18 of Figure 15.

Figures 15, 16 and 17 illustrate a modification of the apparatus of the present invention which may be employed for the manufacture of a rod having a particular filament or wire extending centrally of the finished rod. The modification there illustrated may be used to make a finished rod, a cross-sectional view of which is shown in Figure 18, which is suitable for use, for example, as a radio antenna, by using nonconducting materials for forming the body of the rod and using a suitable wire for the central filament or core. The apparatus illustrated in Figures 15, 16 and 17 differs from the above described apparatus in that a spool 230 of copper wire 232 is supported on the frame 176 above the tank 24 and the wire 232 is trained downwardly through suitable tension applying means such as that illustrated at 234 and thence around a suitable guide positioned to dispose the wire 232 at the center of the bundle into which the filaments 22 are gathered by the preform die 46.

The tension applying means 234 may be of any suitable construction and in the embodiment illustrated, comprises a pair of shoes 236 supported on and horizontally movable relative to bars 238 fastened to the frame 176. The shoes 236 are grooved to receive and engage the wire 232 and are yieldably urged into engagement with the wire 232 by springs 240. The above mentioned guide, in the embodiment illustrated, comprises a roller 242 having an annular V-groove 244 to insure accurate location of the wire 232.

The accurate location of the wire core 232 is important in rods such as radio antennas where it may be desirable to form the rod to a tapered finished shape, as by grinding.

It will be readily appreciated by those skilled in the art that numerous modifications and changes may be made in the above described method and apparatus without departing from the spirit of the present invention.

What is claimed is:

1. A method of making rods by a continuous process comprising the steps of coating a large number of fine filaments with a suitable plastic capable of being hardened, gathering the coated strands into a bundle having a predetermined cross-sectional shape, applying a single thin covering strip to said bundle so that said strip extends longitudinally of and substantially encloses said bundle and the opposite edge portions of said strip extend upwardly and outwardly from said bundle in substantially parallel and adjacent relation, moving the covered bundle through a form adapted to maintain the bundle in the desired shape and having a longitudinally extending slot in its upper side receiving and permitting passage of said outwardly extending edge portions of said strip while permitting movement of said edge portions sufficiently to allow for escape of gas throughout the length of said form, and hardening said plastic during said movement of said bundle through said form, said thin strip being adapted to prevent contact of said bundle with said form and to remain readily movable relative to said form during the hardening of said plastic during the movement through said form.

2. A method of making rods by a continuous process comprising the steps of coating a large number of fine filaments with a suitable plastic capable of being hardened, gathering the coated strands into a bundle having a predetermined cross-sectional shape, applying a single thin covering strip to said bundle so that said strip extends longitudinally of and substantially encloses said bundle and the opposite edge portions of said strip extend upwardly and outwardly from said bundle in substantially parallel and adjacent relation, moving said bundle and said strip through a restriction forcing said strip into contact with substantially the entire outer surface of said plastic and causing a small amount of said plastic to flow outwardly between said edge portions of said strip to form a small flange, said restriction having a cross-sectional shape similar to said predetermined shape and having a slot at the upper side thereof through which said edge portions and said flange pass, moving the covered bundle through a form adapted to maintain the bundle in the desired shape and having a longitudinally extending slot receiving and permitting passage of said flange and of said outwardly extending edge portions of said strip, said form having an internal cross-sectional shape similar to and slightly larger than that of said restriction, and hardening said plastic during said movement of said bundle through said form, said thin strip being adapted to prevent contact of said bundle with said form and to remain readily movable relative to said form during the hardening of said plastic during the movement through said form.

3. A method of making rods by a continuous process comprising the steps of coating a large number of fine filaments with a suitable plastic capable of being hardened, gathering the coated strands into a bundle having a predetermined cross-sectional shape, applying a single thin covering strip to said bundle so that said strip extends longitudinally of and substantially encloses said bundle and the opposite edge portions of said strip extend upwardly and outwardly from said bundle in substantially parallel and adjacent relation, moving said bundle and said strip through a restriction forcing said strip into contact with substantially the entire outer surface of said plastic and causing a small amount of said plastic to flow outwardly between said edge portions of said strip to form a small flange, said restriction having a cross-sectional shape similar to said predetermined shape and a slot at the upper side thereof through which said edge portions and said flange pass, moving the covered bundle through a form having a longitudinally extending slot receiving and permitting passage of said flange and of said outwardly extending edge portions of said strip, said form having an internal cross-sectional shape similar to and slightly larger than that of said restriction, removing said covering strip from said rod, and removing said small flange from said rod.

4. An apparatus for making a continuous rod comprising means for coating a large number of fine filaments with a suitable plastic capable of being hardened, means for gathering the coated filaments into a bundle having a predetermined cross-sectional shape, means for covering said bundle with a single thin strip extending longitudinally of and substantially enclosing said bundle and having its edge portions extending upwardly and outwardly from said bundle in substantially parallel adjacent relation, an enlongated form adapted to receive the covered bundle and maintain the bundle in said predetermined shape and having a slot at the upper side thereof extending throughout its length and adapted to receive said edge portions of said strip and of a width adapted to permit separation of said edge portions to allow for escape of gases from said bundle throughout the length of said form, means for moving the covered bundle through said form, and means for curing said hardenable plastic during said movement of said bundle through said form.

5. An apparatus for making a continuous rod comprising means for coating a large number of fine filaments with a hardenable plastic, means for gathering the coated filaments into a bundle having a predetermined cross-sectional shape, means for covering said bundle with a single thin strip extending longitudinally of and substantially enclosing said bundle and having its edge portions extending outwardly from said bundle in substantially parallel adjacent relation, said last named means including a die adapted, upon movement of said bundle and strip therethrough, to force said strip into contact with substantially the entire outer surface of said bundle to eliminate air which may be between said strip and said bundle, an elongated form adapted to receive the covered bundle and maintain the bundle in said predetermined shape and having a slot at the upper side thereof extending throughout its length and adapted to receive said edge portions of said strip and having a width permitting escape of gas from said bundle between said edge portions throughout the length of said form, means for moving the covered bundle from said die and through said form with said edge portions extending outwardly through said slot, and means for curing said hardenable plastic during said movement of said bundle through said form.

6. An apparatus for making a continuous rod comprising means for coating a large number of fine filaments with a suitable plastic capable of being hardened, means for gathering the coated filaments into a bundle having a predetermined cross-sectional shape, means for covering said bundle with a single thin strip extending longitudinally of and substantially enclosing said bundle and having its edge portions extending upwardly and outwardly from said bundle in substantially parallel and adjacent relation, said last named means comprising means for mounting a roll of said strip material below said bundle and dispensing said strip to the under side of said bundle with the center portion of said strip underlying the center of said bundle, a die adapted upon movement of said bundle and strip therethrough to force said strip into contact with substantially the entire outer surface of said bundle to eliminate air from between said strip and said bundle, and an elongated guide disposed at one side of said die for initiating the wrapping of said strip about said bundle, an elongated form disposed at the opposite side of said die from said guide and adapted to receive the covered bundle from said die and maintain said bundle in said predetermined shape, said form having a slot at the upper side thereof extending throughout its length and adapted to receive said edge portions of said strip, means for moving the covered bundle from said die and through said form with said edge portions extending upwardly and outwardly through said slot, and means for curing said hardenable plastic during said movement of said bundle through said form.

7. An apparatus for making a continuous rod comprising means for coating a large number of fine filaments with a suitable plastic capable of being hardened, means for gathering the coated filaments into a bundle having a predetermined cross-sectional shape, means for covering said bundle with a single thin strip extending longitudinally of and substantially enclosing said bundle and having its edge portions extending upwardly and outwardly from said bundle in substantially parallel and adjacent relation, said last named means comprising means for mounting a roll of said strip material below said bundle and dispensing said strip to the under side of said bundle with the center portion of said strip underlying the center of said bundle, a die adapted upon movement of said bundle and strip therethrough to force said strip into contact with substantially the entire outer surface of said bundle to eliminate air from between said strip and said bundle, said die being slotted at the upper side thereof and so proportioned as to cause a small amount of plastic to flow outwardly between said edge portions of said strip to form a small flange, and an elongated guide disposed at one side of said die for initiating the wrapping of said strip about said bundle, said guide having substantially the shape of the smaller tube segment defined by a plane including a diameter at one end of a tube and inclined at a small angle relative to the axis of the tube, an elongated form disposed at the opposite side of said die from said guide and adapted to receive the covered bundle from said die and maintain said bundle in said predetermined shape, said form having a slot at the upper side thereof extending throughout its length and adapted to receive said edge portions of said strip, means for moving the covered bundle from said die and through said form with said edge portions extending upwardly and outwardly through said slot, means for curing said hardenable plastic during said movement of said bundle through said form, means for removing said strip from the rod formed by hardening the plastic after the rod is drawn from the form, and means for removing said flange from the rod.

References Cited in the file of this patent

UNITED STATES PATENTS

| | | |
|---|---|---|
| 2,432,752 | Gray | Dec. 16, 1947 |
| 2,526,945 | Gray | Oct. 24, 1950 |
| 2,571,717 | Howald et al. | Oct. 16, 1951 |
| 2,585,484 | Menes | Feb. 12, 1952 |
| 2,625,498 | Koch | Jan. 13, 1953 |

FOREIGN PATENTS

| | | |
|---|---|---|
| 892,116 | France | Jan. 3, 1944 |